UNITED STATES PATENT OFFICE.

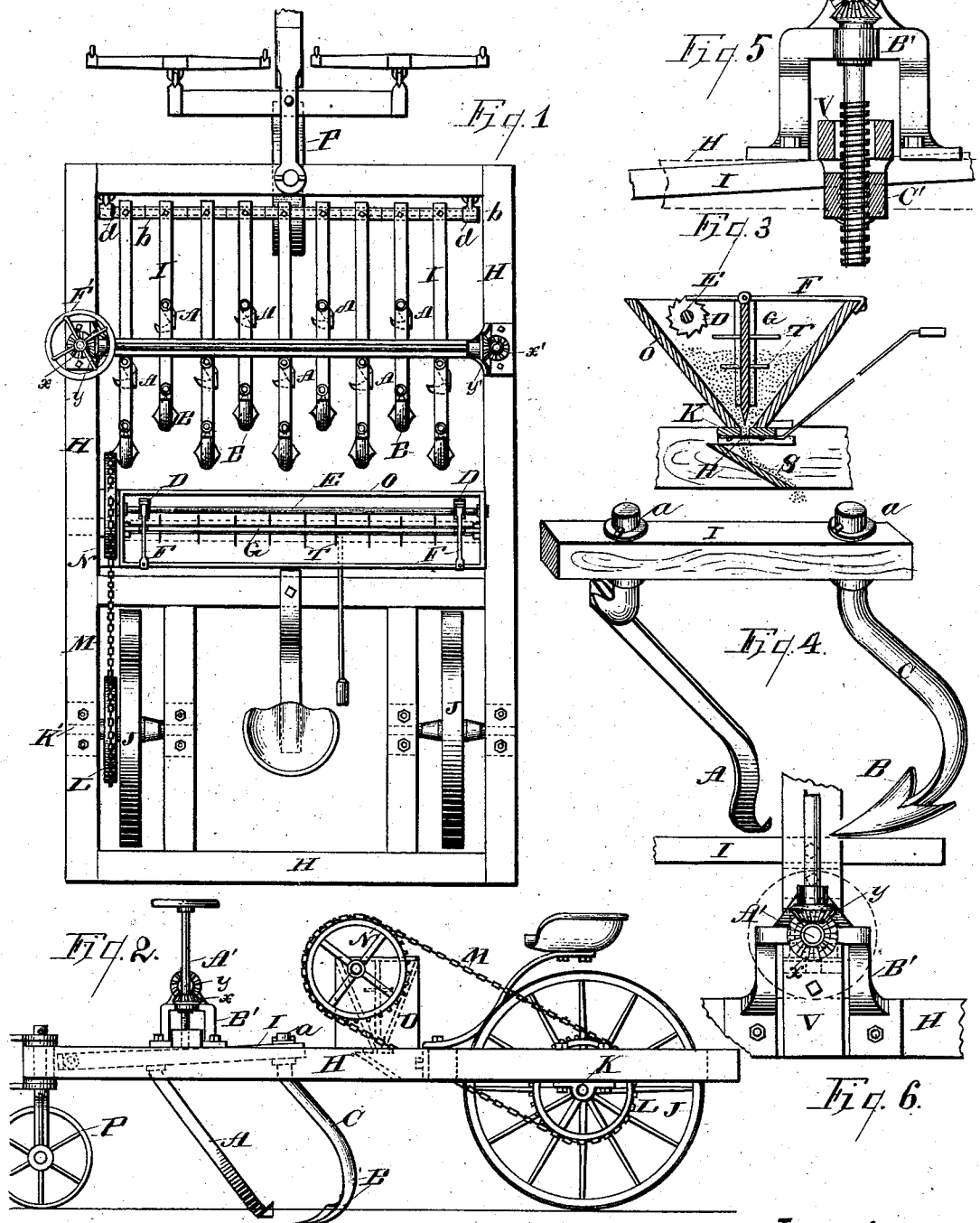

WELCOME J. BURDICK, OF HUBBLETON, WISCONSIN.

GRASS-LAND SCARIFIER.

SPECIFICATION forming part of Letters Patent No. 260,529, dated July 4, 1882.

Application filed January 23, 1882. (No model.)

*To all whom it may concern:*

Be it known that I, WELCOME J. BURDICK, a citizen of the United States, residing at Hubbleton, in the county of Jefferson and State of Wisconsin, have invented certain new and useful Improvements in Grass-Land Scarifiers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The object of my invention is to provide a machine for cultivating the surface of grass-lands and sowing grass-seed thereon.

My invention consists in the peculiar construction of the teeth and shanks, the manner of attaching them to the draw-bars, the device for sowing the seed; in the arrangement of the teeth, draw-bars, supporting-frame, and device for raising, lowering, and adjusting the teeth; and in the general arrangement and adaptation of all of such parts to each other.

My invention is further explained by reference to the accompanying drawings, in which Figure 1 represents a ground plan. Fig. 2 is a side view. Fig. 3 is a vertical section of the seed-box. Fig. 4 is a perspective of two of the scarifying-teeth attached to one of the draw-bars. Fig. 5 is a side view of the device for raising the draw-bars, and Fig. 6 is a top view of the device shown in Fig. 5.

Like parts are represented by the same reference-letters in the several views.

H is a substantial frame, by which the operative parts are supported and operated.

J J are the rear supporting-wheels, from one of which motion is communicated to the seeder.

P is the front supporting-wheel, which is connected to the front end of the frame by a caster-joint adapted to permit said wheel to turn in its bearings as the frame is turned, so that the front of said wheel will be kept toward the line of motion.

I I I are the draw-bars, to which the scarifying-teeth A and B are attached by caster-joints *a a*. The front ends of the draw-bars I are connected together by rod *b*, which extends from one side of the frame H to the other. Rod *b* is attached to the front end of the frame by hinges *d d*.

O is the seed-box, which is supported upon frame H.

K is an adjustable slide, by which the feed is regulated.

The aperture R in the slide remains at a uniform fixed width, and the escape of seed is governed by adjusting the slide so that said aperture is brought more or less beneath the sides of the box O. When the aperture is partially beneath one of the sides of the box the escape of seed is reduced. When it is in the center of the seed-box the seed escapes more rapidly.

S is a scattering-board, upon which the seed falls in its course to the ground, and is thereby more uniformly scattered over the soil.

G is an agitating-gate, by which the aperture R in the slide is prevented from becoming clogged and a more uniform feed is insured. The gate G is provided with cross-pins T, which agitate the seed as the gate rises and falls. The gate is suspended from the spring-pawls F, which are attached to the box at one end, and their other ends rest on the ratchet-wheels E, by which the springs are caused to rise and fall as the teeth of the ratchets pass beneath them.

Motion is communicated from one of the wheels J to the seed-distributer by chain-gear L, chain M, chain-gear N, shaft E, and ratchets D D.

A A are a series of scarifying-knives, one of which is shown in perspective in Fig. 4. The lower end of knife A is curved upward in a U shape, and the cutting-edge is formed at the center of the curve. The upper end of the shank is formed with a side curve at right angles to the draw-bar toward one side of the machine, while the lower end, forming the cutting-blade, curves in the opposite direction, whereby the cutting-edge or center of the U-shaped curve is brought in line with the point of attachment with and beneath the center of the draw-bar, and the shank is inclined backward in rear of the caster-joint, as shown in Fig. 4, whereby the knife is prevented from turning as the machine is drawn forward. The rear tooth, B, is made concave in front and convex in rear, so that the soil is thrown toward its center and escapes over the top of the flanges. The shank C is curved backward in an S shape, as shown, whereby the tooth is brought beneath the caster-joint, while the said backward curve prevents the tooth from being turned by contact with the soil as it is drawn forward. The bars I are provided with a connecting cross-bar, V, by which they are all simultaneously raised, lowered, and adjusted. The respective ends of the cross-bars V are connected with the screws A' A', as shown in Figs. 5 and 6. Said screws are supported upon the stationary frame H by the brackets B' B'. The nuts C of said screws are pivoted to said cross-bar, whereby the cross-bar and draw-bars are caused to move upward and downward with said nuts as said screws are turned. Thus, it is obvious that said teeth may be rigidly adjusted by said screws to cut any desired depth, or raised out of contact with the soil. One of the screws A' is provided with a hand-wheel, F', by which it is rotated, and motion is communicated from such screw to the other by beveled gears $x$ $y$, shaft E, and beveled gears $x'$ $y'$, by means of which one person may operate both screws simultaneously.

It is obvious that by connecting the scarifying teeth and knives to the draw-bars by caster-joints, as shown, the cutting-edges will be kept forward and prevented from turning by contact with the soil as the machine is drawn forward, as mentioned, while in turning the machine they are free to turn in the bearings of the caster-joints, whereby their front or cutting surfaces are kept toward the line of motion as well when turning as when being drawn forward, and they are thereby relieved of the side or twisting strain in turning to which rigidly-fixed teeth are subject.

Having thus described my invention, what I claim as new, and desire to secure by Letters Patent, is—

1. In a grass-land scarifier, the combination, with the draw bars or beams I, of the peculiar spiral U-shaped knives A and spear-shaped teeth B, said knives and teeth being secured to said draw-bars by caster-joints, substantially as and for the purpose specified.

2. In a grass-land seeder and scarifier, the agitator or device herein described for ejecting and uniformly distributing the seeds from the seed-box, consisting of the ratchet-wheels D D, shaft E, spring-pawl F, and gate G, said gate being pivoted to said spring-pawl and adapted to rise and fall as the teeth of said ratchet pass beneath said spring, motion being communicated from the drive-wheel of the machine to the seed-distributer by chain-gear or other equivalent mechanism, substantially as set forth.

3. The combination of frame H, series of draw-bars I, U-shaped knives A and arrow-shaped teeth B, drive-wheels J J, revolving axle or shaft K', chain-wheel L, chain M, and chain-wheel N, said combination of elements being adapted by their co-operation to simultaneously cut the sod, loosen the soil, and distribute the seeds, substantially as and for the purpose specified.

In testimony whereof I affix my signature in presence of two witnesses.

WELCOME J. BURDICK.

Witnesses:
   JAS. B. ERWIN,
   E. G. ASMUS.